United States Patent
Morimoto et al.

(10) Patent No.: US 10,661,780 B2
(45) Date of Patent: May 26, 2020

(54) CONTROLLER FOR VEHICLE

(71) Applicant: DENSO CORPORATION, Kariya, Aichi-pref. (JP)

(72) Inventors: Youhei Morimoto, Kariya (JP); Yutaro Ito, Kariya (JP); Noriaki Ikemoto, Kariya (JP); Masuhiro Kondo, Kariya (JP); Takahiro Narita, Kariya (JP)

(73) Assignee: DENSO CORPORATION, Kariya (JP)

( * ) Notice: Subject to any disclaimer, the term of this patent is extended or adjusted under 35 U.S.C. 154(b) by 99 days.

(21) Appl. No.: 15/772,328

(22) PCT Filed: Oct. 11, 2016

(86) PCT No.: PCT/JP2016/080056
§ 371 (c)(1),
(2) Date: Apr. 30, 2018

(87) PCT Pub. No.: WO2017/098799
PCT Pub. Date: Jun. 15, 2017

(65) Prior Publication Data
US 2018/0312158 A1    Nov. 1, 2018

(30) Foreign Application Priority Data

Dec. 7, 2015 (JP) .................................. 2015-238987

(51) Int. Cl.
*B60W 20/14* (2016.01)
*B60K 6/48* (2007.10)
(Continued)

(52) U.S. Cl.
CPC .............. *B60W 20/14* (2016.01); *B60K 6/26* (2013.01); *B60K 6/442* (2013.01); *B60K 6/48* (2013.01);
(Continued)

(58) Field of Classification Search
CPC ...... B60W 20/14; B60W 20/12; B60W 20/13; B60W 2550/142; B60W 10/08;
(Continued)

(56) References Cited

U.S. PATENT DOCUMENTS 6,314,347 B1    11/2001  Kuroda et al.
9,702,718 B2 *   7/2017  Payne ................ G01C 21/3469
(Continued)

FOREIGN PATENT DOCUMENTS

JP    2002-171603 A    6/2002
JP    2005-168295 A    6/2005
JP    2015-019521 A    1/2015

OTHER PUBLICATIONS

Jan. 10, 2017 Search Report issued in International Patent Application No. PCT/JP2016/080056.

*Primary Examiner* — Michael J Zanelli
(74) *Attorney, Agent, or Firm* — Oliff PLC

(57) ABSTRACT

A controller includes a SOC prediction unit to predict a SOC, based on a predicted result of a road grade and a vehicle speed in a scheduled travel route, and a discharge control unit to execute a discharge increasing control to previously increase a discharge quantity of the battery to prevent the battery from becoming in a saturation state based on a predicted SOC, when the battery becomes in the saturation state. The discharge control unit includes a first mode to execute an assist discharge increasing control in an assist travel, and a second mode to execute an EV discharge increasing control by decreasing the vehicle speed and by increasing an opportunity of an EV travel, as the discharge increasing control. When the EV discharge increasing control can be executed, the EV discharge increasing control is executed with priority relative to the assist discharge increasing control.

5 Claims, 11 Drawing Sheets

(51) Int. Cl.
- B60K 6/547 (2007.10)
- B60W 10/08 (2006.01)
- B60W 10/06 (2006.01)
- B60W 10/26 (2006.01)
- B60L 7/14 (2006.01)
- B60W 20/00 (2016.01)
- B60K 6/442 (2007.10)
- B60W 10/30 (2006.01)
- B60L 50/16 (2019.01)
- B60W 20/13 (2016.01)
- B60W 20/12 (2016.01)
- B60K 6/26 (2007.10)
- B60W 20/20 (2016.01)
- G01C 21/36 (2006.01)

(52) U.S. Cl.
CPC .............. *B60K 6/547* (2013.01); *B60L 7/14* (2013.01); *B60L 50/16* (2019.02); *B60W 10/06* (2013.01); *B60W 10/08* (2013.01); *B60W 10/26* (2013.01); *B60W 10/30* (2013.01); *B60W 20/00* (2013.01); *B60W 20/12* (2016.01); *B60W 20/13* (2016.01); *B60W 20/20* (2013.01); *G01C 21/3691* (2013.01); *B60W 2520/10* (2013.01); *B60W 2520/105* (2013.01); *B60W 2540/12* (2013.01); *B60W 2540/14* (2013.01); *B60W 2540/16* (2013.01); *B60W 2550/142* (2013.01); *B60W 2550/40* (2013.01); *B60W 2550/402* (2013.01); *B60Y 2200/92* (2013.01); *Y02T 10/6221* (2013.01); *Y02T 10/6286* (2013.01); *Y02T 10/7077* (2013.01)

(58) Field of Classification Search
CPC .............. B60W 10/06; G01C 21/3691; B60Y 2200/92; Y02T 10/6286
See application file for complete search history.

(56) References Cited

U.S. PATENT DOCUMENTS

| | | |
|---|---|---|
| 2002/0069000 A1 | 6/2002 | Nakao |
| 2014/0095003 A1* | 4/2014 | Phillips ............... B60L 15/2045 701/22 |
| 2015/0019057 A1 | 1/2015 | Morisaki et al. |
| 2016/0167641 A1* | 6/2016 | Yoon ...................... B60L 58/12 701/22 |

* cited by examiner (a) DESTINATION POSITION INFORMATION & ROUTES WITH MULTIPLE JUNCTIONS (b) NON-DESTINATION POSITION INFORMATION & ROUTE WITHOUT MULTIPLE JUNCTIONS (c) NON-DESTINATION POSITION INFORMATION & ROUTES WITH MULTIPLE JUNCTIONS

CONTROLLER FOR VEHICLE

CROSS REFERENCE TO RELATED APPLICATION

This application is based on Japanese Patent Application No. 2015-238987 filed on Dec. 7, 2015, the disclosure of which is incorporated herein by reference.

TECHNICAL FIELD

The present disclosure relates to a controller applied to a vehicle including an engine and a motor generator as power sources of the vehicle.

BACKGROUND ART

Recently, it is paid attention that a hybrid vehicle is mounted with an engine and a motor generator (MG) as power sources of the hybrid vehicle in response to a social request of a low fuel consumption and a low emission. In the hybrid vehicle, since a battery is charged with a power (regeneration power) regenerated by the MG when the hybrid vehicle is decelerated, an execution time interval of an assist travel using the power of the MG and an executive time interval of an EV travel using the power of the MG can be extended, and a fuel consumption can be improved.

However, when a power regeneration is executed while the hybrid vehicle is on a long downgrade road, it is possible that a SOC indicating a remaining capacity of the battery reaches an upper limit and the battery is in a saturation state that the battery cannot be charged with the regeneration power.

According to Patent Literature 1, a deep discharge control is executed to discharge the battery to have the remaining capacity less than or equal to an intermediate region in a travel phase right before a downgrade travel phase, based on a road information obtained from a navigation device.

PRIOR ART LITERATURE

Patent Literature

Patent Literature 1: JP2002-171603A

SUMMARY OF INVENTION

The inventors study a system to improve a fuel consumption by efficiently using a power regeneration while a discharge increasing control to previously increase a discharge quantity of a battery to prevent the battery from becoming in a saturation state in a case where it is predicted that the battery becomes in the saturation state that the battery cannot be charged with a regeneration power. However, in the discharge increasing control, when an assist discharge increasing control to increase the discharge quantity of the battery in an assist travel where a vehicle travels using both a power of an engine and a power of a MG is executed, it is possible that following matters occur. In the assist travel, an output of the engine decreases by an increasing quantity of an output of the MG that is an increasing quantity of the discharge quantity of the battery. Thus, when the increasing quantity of the discharge quantity caused by the assist discharge increasing control becomes larger, it is more likely that the engine operates at a lower region where an efficiency of the engine is low and the output of the engine is low in the assist travel. Then, it is possible that the fuel consumption is lowered.

It is an object of the present disclosure to provide a controller applied to a vehicle which can effectively improve a fuel consumption.

According to a first mode of the present disclosure, the controller is applied to the vehicle including an engine and a motor generator as power sources of the vehicle and a battery that transfer power with the motor generator. The controller charges the battery with a regeneration power that is a power regenerated by the motor generator when the vehicle is decelerated. The controller includes a SOC prediction unit to predict a SOC indicating a remaining capacity of the battery in a scheduled travel route of the vehicle, based on a predicted result of a road grade and a vehicle speed in the scheduled travel route, and a discharge control unit to execute a discharge increasing control to previously increase a discharge quantity of the battery to prevent the battery from becoming in a saturation state based on the SOC predicted by the SOC prediction unit, when the discharge control unit determines that the battery becomes in the saturation state where the battery cannot be charged with the regeneration power. The discharge control unit includes a first mode to execute an assist discharge increasing control as the discharge increasing control to increase the discharge quantity of the battery in an assist travel where the vehicle travels by both power of the engine and power of the motor generator, and a second mode to execute an EV discharge increasing control as the discharge increasing control to increase the discharge quantity of the battery by decreasing the vehicle speed and by increasing an opportunity of an EV travel where the vehicle travels only by power of the motor generator. When the EV discharge increasing control can be executed, the EV discharge increasing control is executed with priority relative to the assist discharge increasing control.

According to the above configuration, the controller predicts the predicted SOC that is the SOC in the scheduled travel route based on the predicted result of the road grade and the vehicle speed in the scheduled travel route. When the system determines or predicts that the battery is in the saturation state based on the predicted SOC, the system previously executes a discharge increasing control to increase a discharge quantity of the battery to prevent the battery from becoming in the saturation state. In this case, the system prevents the SOC from reaching the upper limit. Thus, the controller can prevent the battery from becoming in the saturation state, can effectively use the power regeneration and can improve the fuel consumption.

The discharge increasing control includes the assist discharge increasing control to increase the discharge quantity of the battery in the assist travel, and an EV discharge increasing control to increase the discharge quantity of the battery by increasing an opportunity of the EV travel by decreasing the vehicle speed. Further, the discharge control unit includes the first mode to execute the assist discharge increasing control and the second mode to execute the EV discharge increasing control. However, in the assist travel, an output of the engine decreases by an increasing quantity of an output of the motor generator that is an increasing quantity of the discharge quantity of the battery. Thus, when the increasing quantity of the discharge quantity caused by the assist discharge increasing control becomes larger, it is more likely that the engine operates at a lower region where an efficiency of the engine is low and the output of the engine is low in the assist travel. Then, it is possible that the fuel consumption is lowered.

When the EV discharge increasing control can be executed, the EV discharge increasing control is executed with priority relative to the assist discharge increasing control. Thus, the discharge quantity caused by the EV discharge increasing control can be increased, and the discharge quantity caused by the assist discharge increasing control can be decreased. Thus, an opportunity that the engine operates in a region where the efficiency of the engine is low in the assist travel can be suppressed, and the fuel consumption can be effectively improved.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Figure 1:
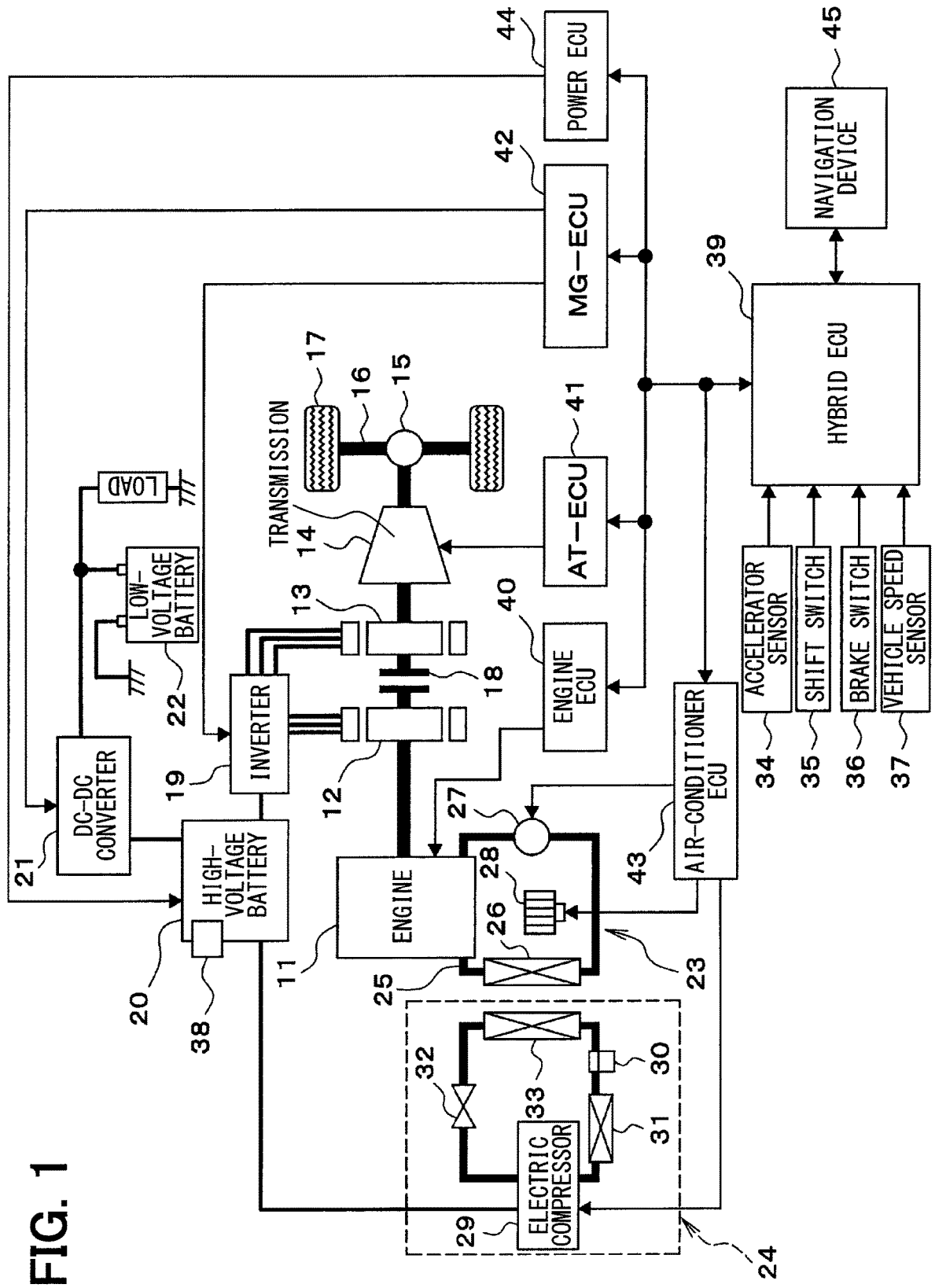
FIG. 1 is a schematic diagram showing an outline of a control system of a hybrid vehicle according to a first embodiment of the present disclosure.

Hereafter, embodiments of the present disclosure will be detailed.

First Embodiment

A first embodiment of the present disclosure will be described with reference to FIGS. 1 to 10.

First, an outline of a control system of a hybrid vehicle will be described referring to FIG. 1.

An engine 11 that is an internal combustion engine, a first motor generator (first MG) 12 and a second motor generator (second MG) 13 are mounted to a vehicle that is the hybrid vehicle, as power sources. A power of a crank shaft that is an output shaft of the engine 11 is transmitted to a transmission 14 through the MG 12, 13. A power of an output shaft of the transmission 14 is transmitted to a driving wheel that is a wheel 17 through a differential gear mechanism 15 and an axle 16. The transmission 14 may be a stage transmission that switches between multiple transmission stages (levels) or may be a continuously variable transmission (CVT) that changes a speed with non-stage. A clutch 18 is between the first MG 12 and the second MG 13. The clutch 18 allows and interrupts a power transmission.

An inverter 19 that drives the MG 12, 13 is connected with a high-voltage battery 20. The MG 12, 13 transfer power with the high-voltage battery 20 through the inverter 19. A low-voltage battery 22 is connected with the high-voltage battery 20 through a DC-DC converter 21. The high-voltage battery 20 and the low-voltage battery 22 are batteries that can be charged and discharged. A low-voltage load is connected with the DC-DC converter 21. The low-voltage load consumes power supplied from the high-voltage battery 20 through the DC-DC converter 21 or consumes power supplied from the low-voltage battery 22. The low-voltage load, for example, may be an electric water pump 27 or a blower fan 28.

A warm-water heater 23 that uses a heat of a coolant of the engine 11 and an electric air-conditioner 24 such as a heat pump device are mounted to the vehicle.

The warm-water heater 23 includes a warm-water circuit 25 that is connected with a coolant passage (water jacket) of the engine 11. The warm-water circuit 25 includes a heater core 26 for heating and the electric water pump 27. The electric water pump 27 circulates the coolant (or warm water) between the engine 11 and the heater core 26. The blower fan 28 that generates a warm wind is located in the vicinity of the heater core 26.

The electric air-conditioner 24 includes an electric compressor 29, an accumulator 30, an outer heat exchanger 31, an expansion valve 32 and an inner heat exchanger 33. The electric compressor 29 receives power from the high-voltage battery 20.

An accelerator sensor 34 senses an accelerator position that is an operation quantity of an accelerator pedal. A shift switch 35 senses an operation position of a shift lever. A brake switch 36 senses a brake operation (or a brake sensor senses a brake operation quantity). A vehicle speed sensor 37 senses a vehicle speed. A battery temperature sensor 38 senses a temperature of the high-voltage battery 20.

A hybrid ECU 39 is a control unit that generally controls the entire vehicle. The hybrid ECU 39 loads output signals of various sensors and switches, and detects an operation state of the vehicle. The hybrid ECU 39 sends control signals and data signals to an engine ECU 40, an AT-ECU 41, a MG-ECU 42 and an air-conditioner ECU 43 and receives control signals and data signals from the engine ECU 40, the AT-ECU 41, the MG-ECU 42 and the air-conditioner ECU 43. According to the present embodiment, the hybrid ECU 39 is a controller applied to the vehicle.

The engine ECU 40 is a control unit that controls an operation of the engine 11. The AT-ECU 41 is a control unit that controls the transmission 14. The MG-ECU 42 is a control unit that controls the MG 12, 13 by controlling the inverter 19 and controls the DC-DC converter 21. The air-conditioner ECU 43 is a control unit that controls the warm-water heater 23 and the electric air-conditioner 24 (e.g., the electric water pump 27, the blower fan 28, or the electric compressor 29).

The hybrid ECU 39 controls the engine 11, the transmission 14, the MG 12, 13, the DC-DC converter 21, the warm-water heater 23 and the electric air-conditioner 24, according to the operation state of the vehicle obtained from ECUs 40 to 43. The hybrid ECU 39 sends control signals and data signals to a power ECU 44 and a navigation device 45 and receives control signals and data signals from the power ECU 44 and the navigation device 45. The power ECU 44 monitors the high-voltage battery 20.

The hybrid ECU 39 switches a travel mode between an engine travel mode, an assist travel mode and an EV travel mode. In the engine travel mode, the vehicle travels by executing an engine travel to drive the wheel 17 only by power of the engine 11. In the assist travel mode, the vehicle travels by executing an assist travel to drive the wheel 17 using power of the engine 11 and at least power of the second MG 13 between the first MG 12 and the second MG 13. In this case, the wheel 17 may be driven by power of the engine 11 and power of the second MG 13, or may be driven by power of the engine 11, power of the first MG 12 and power of the second MG 13. In the EV travel mode, the vehicle travels by executing an EV travel to drive the wheel 17 using at least power of the second MG 13 between the first MG 12 and the second MG 13. In this case, the wheel 17 may be driven only by power of the second MG 13, or may be driven by power of the first MG 12 and power of the second MG 13.

When the vehicle decelerated (e.g., a braking force is generated while the accelerator is off or the brake is on), the hybrid ECU 39 switches the travel mode to a power regeneration mode. In the power regeneration mode, only the second MG 13 or both the first MG 12 and the second MG 13 are driven by power of the wheel 17. In this case, a kinematic energy of the vehicle is converted into an electric energy by only the second MG 13 or both the first MG 12 and the second MG 13 to execute a power regeneration, and the high-voltage battery 20 is charged with a regeneration power that is a power regenerated by the power regeneration. Thus, an executive time interval of the assist travel and an executive time interval of the EV travel can be extended, and a fuel consumption can be improved.

When the power generation is executed while the vehicle is on a long downgrade road, it is possible that a SOC reaches an upper limit and the high-voltage battery 20 is in a saturation state that the high-voltage battery 20 cannot be charged with the regeneration power. The SOC that is a state of charge indicates a remaining capacity of the high-voltage battery 20. The SOC, for example, is defined by a following equation.

SOC=remaining capacity/full charge capacity×100

Figure 3:
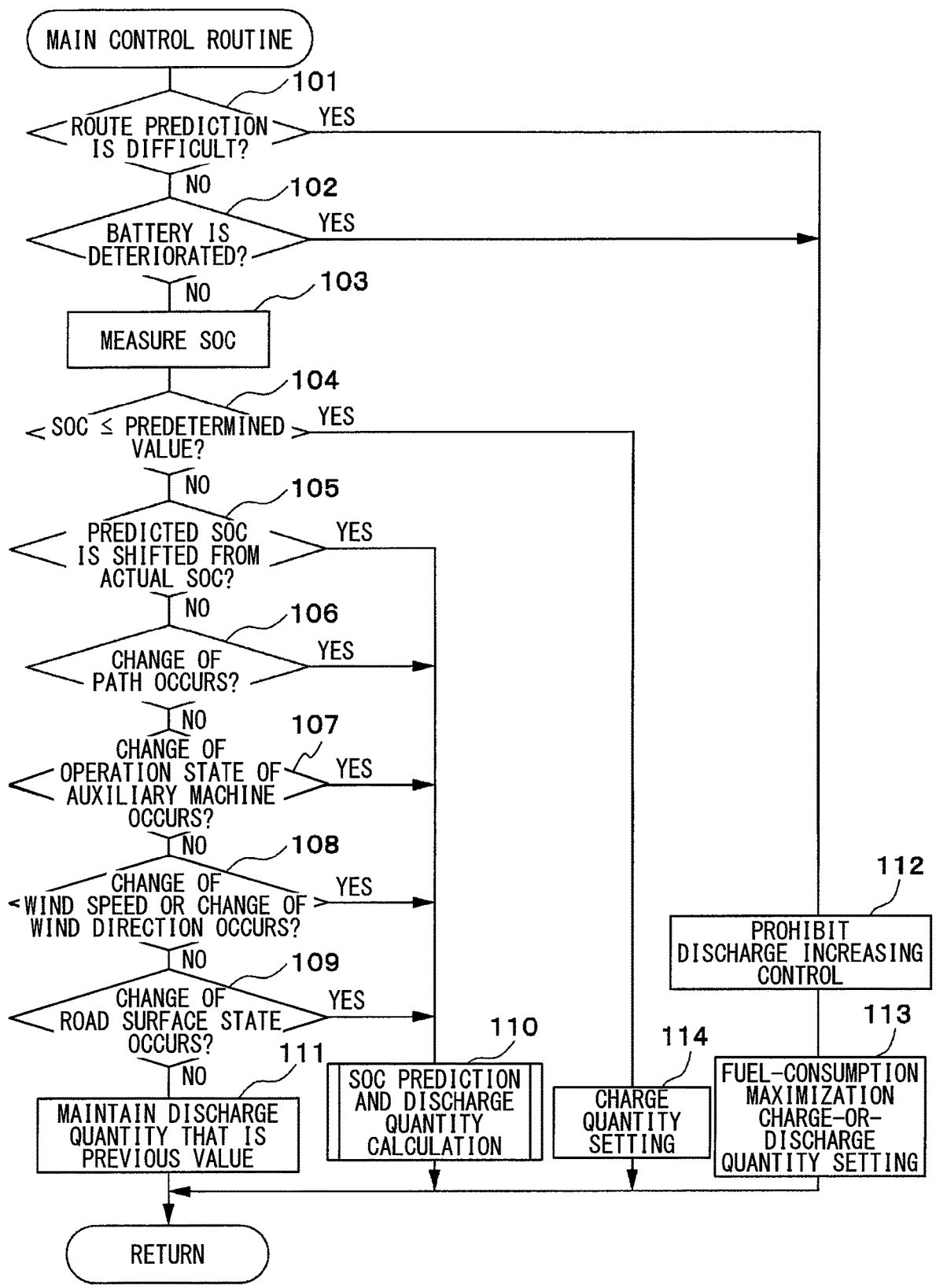
FIG. 3 is a flowchart showing a processing of a main control routine.
Figure 4:
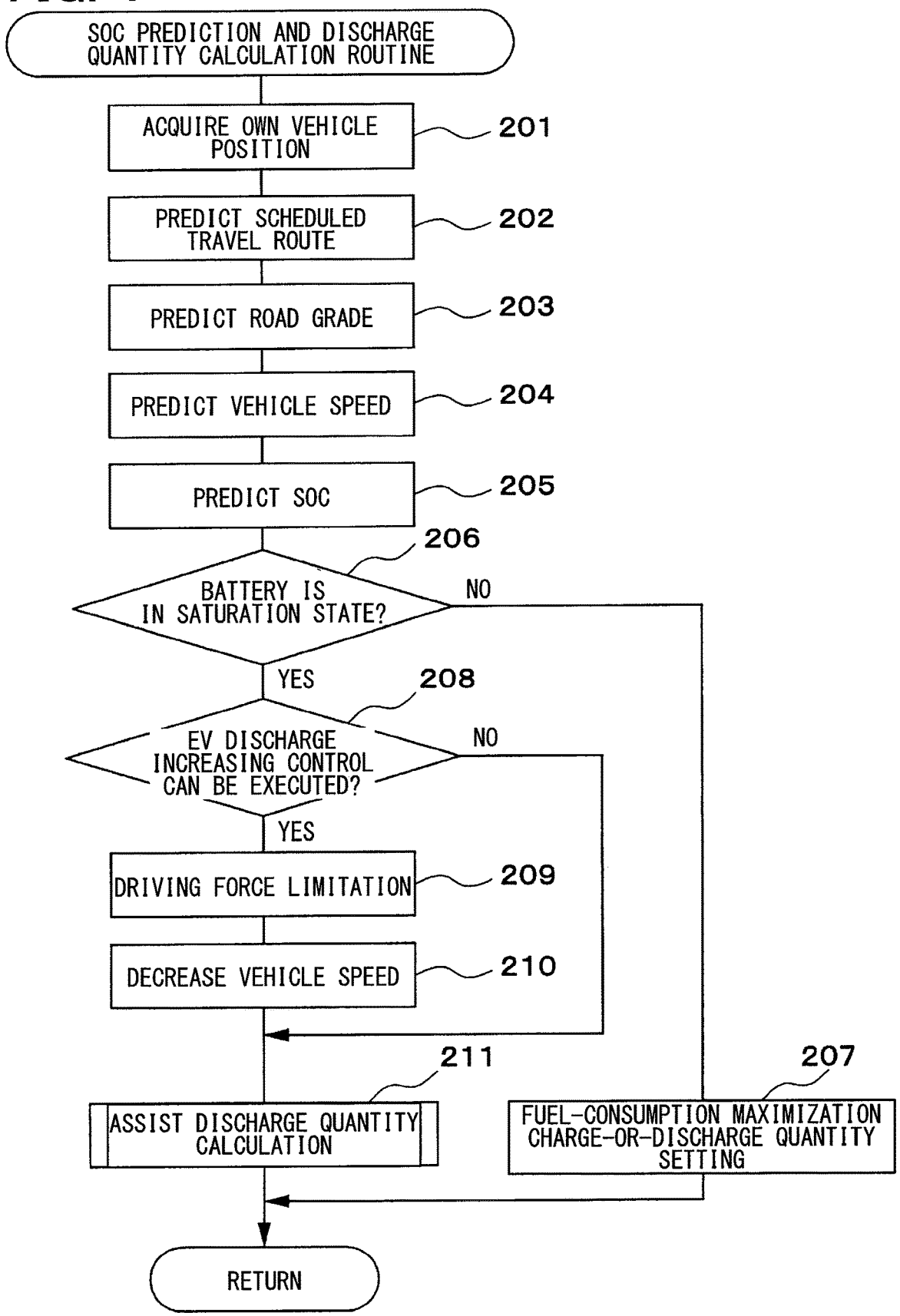
FIG. 4 is a flowchart showing a processing of a SOC prediction and discharge quantity calculation routine.
Figure 5:
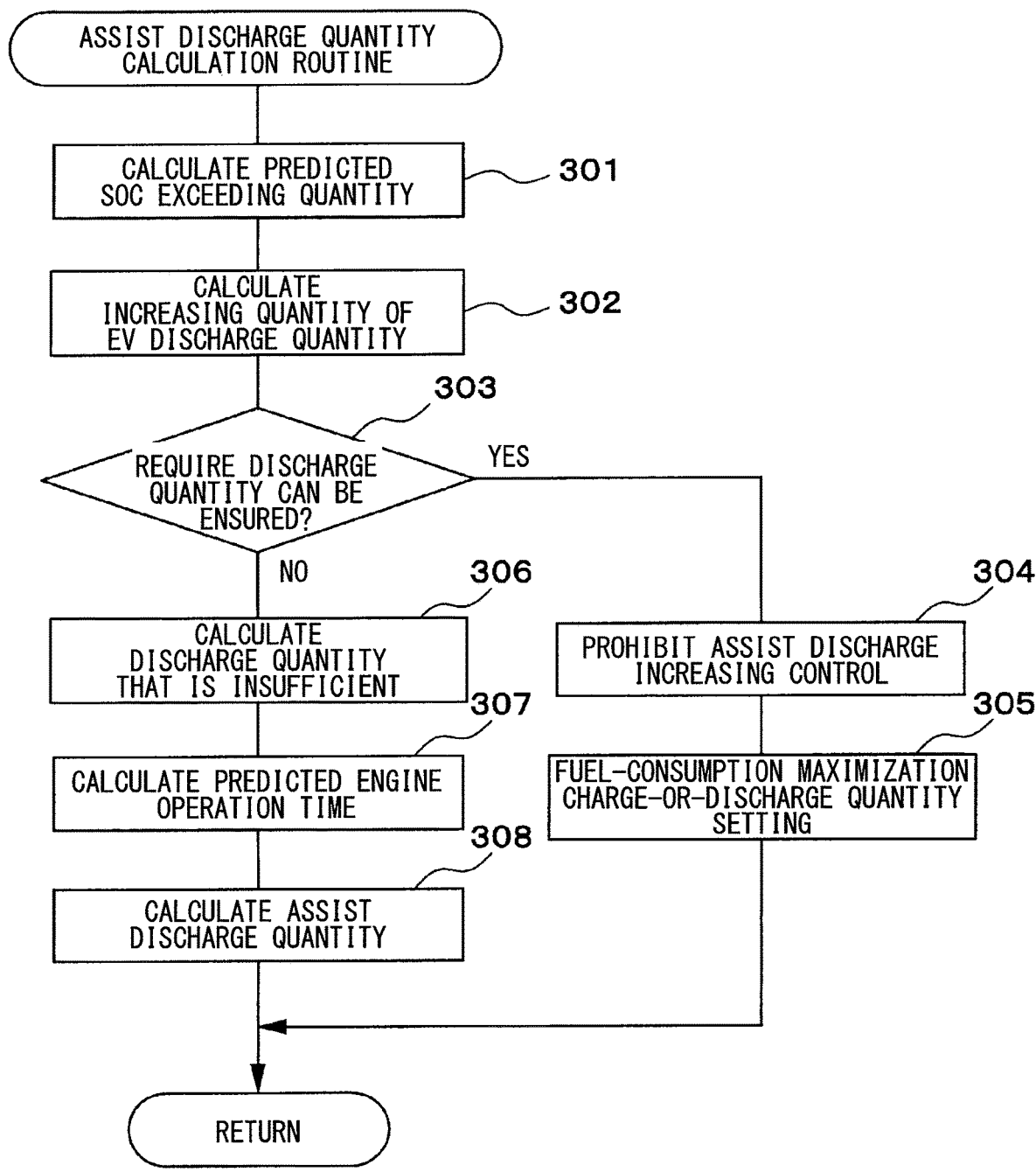
FIG. 5 is a flowchart showing a processing of an assist discharge quantity calculation routine.

According to the first embodiment, the hybrid ECU 39 executes routines shown in FIGS. 3 to 5 as following to prevent that the high-voltage battery 20 becomes in the saturation state where the high-voltage battery 20 cannot be charged with the regeneration power.

The hybrid ECU 39 predicts a predicted SOC that is the SOC in a scheduled travel route of the vehicle, based on predicted results of a road grade and the vehicle speed in the scheduled travel route. When the hybrid ECU 39 determines or predicts that the high-voltage battery 20 is in the saturation state based on the predicted SOC, the hybrid ECU 39 previously executes a discharge increasing control to increase a discharge quantity of the high-voltage battery 20 to prevent the high-voltage battery 20 from becoming in the saturation state based on the predicted SOC. In this case, the hybrid ECU 39 prevents the SOC from reaching the upper limit. Thus, the hybrid ECU 39 can prevent the high-voltage battery 20 from becoming in the saturation state, can effectively use the regeneration power, and can improve the fuel consumption.

As the discharge increasing control, an assist discharge increasing control to increase the discharge quantity of the high-voltage battery 20 in the assist travel, or an EV discharge increasing control to increase the discharge quantity of the high-voltage battery 20 by increasing an opportunity of the EV travel by decreasing the vehicle speed, is executed. However, in the assist travel, the output of the engine 11 decreases by an increasing quantity of the output of the MG 12, 13 that is an increasing quantity of the discharge quantity of the high-voltage battery 20. Thus, when the increasing quantity of the discharge quantity caused by the assist discharge increasing control becomes larger, it is more likely that the engine 11 operates at a lower region where an efficiency of the engine 11 is low and the output of the engine 11 is low in the assist travel. Then, it is possible that the fuel consumption is lowered.

Since the EV discharge increasing control is executed with priority relative to the assist discharge increasing control when the EV discharge increasing control can be executed, the increasing quantity of the discharge quantity caused by the EV discharge increasing control increases, and the increasing quantity of the discharge quantity caused by the assist discharge increasing control decreases. In this case, when a required discharge increasing quantity that is the increasing quantity of the discharge quantity necessary to prevent the high-voltage battery 20 from becoming in the saturation state can be ensured by the EV discharge increasing control, the assist discharge increasing control is not executed. When the required discharge increasing quantity cannot be ensured by the EV discharge increasing control, an insufficient quantity relative to the required discharge increasing quantity is corrected by the increasing quantity of the discharge quantity caused by the assist discharge increasing control. In this case, the insufficient quantity is a difference between the required discharge increasing quantity and the increasing quantity of the discharge quantity caused by the EV discharge increasing control. As a result, the EV discharge increasing control is executed with priority relative to the assist discharge increasing control. According to the present embodiment, the hybrid ECU 39 includes a road grade prediction unit 46, a vehicle speed prediction unit 47, a travel output calculation unit 48, a battery output calculation unit 49, a SOC prediction unit 50, an assist discharge quantity calculation unit 51, an HV control unit 52, an EV discharge increasing control unit 55 and a speed control unit 56.

Figure 2:
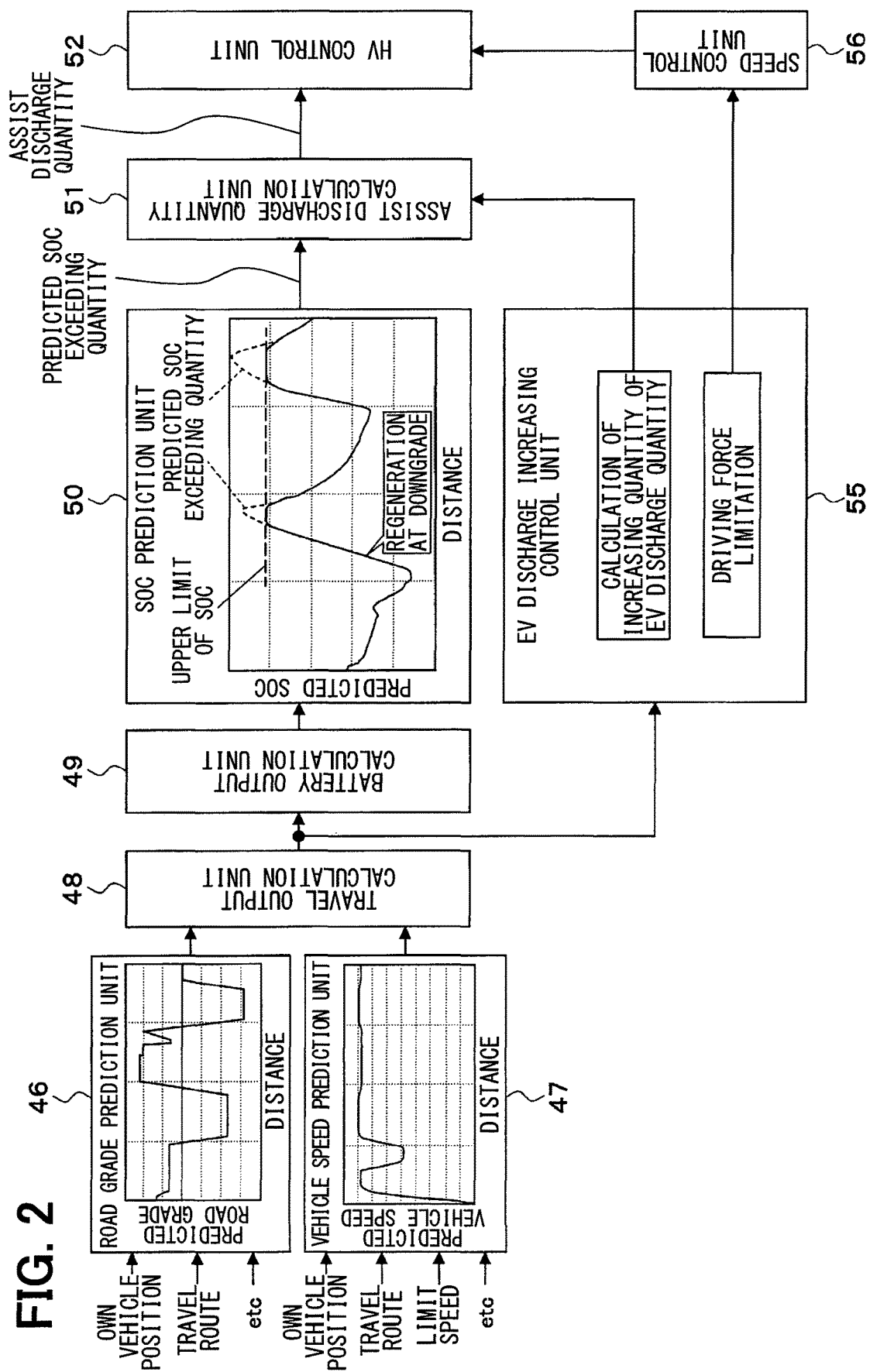
FIG. 2 is a block diagram showing modes of a SOC prediction and a discharge increasing control.

Specifically, as shown in FIG. 2, the road grade prediction unit 46 predicts a behavior of a road grade from a current position to a predetermined destination position in the scheduled travel route, based on an own vehicle position information and a travel route information obtained by the navigation device 45 or by a locator. In this case, a predetermined distance from the current position to the predetermined destination position is, for example, 10 km.

The vehicle speed prediction unit 47 predicts a behavior of the vehicle speed from the current position to the predetermined destination position in the scheduled travel route, based on the own vehicle position information, the travel route information and a limit speed information obtained by the navigation device or the locator and based on a traffic information, a weather information and a peripheral information obtained by a high-level drive assist system.

The travel output calculation unit 48 calculates or predicts a behavior of a travel output from the current position to the predetermined destination position in the scheduled travel route, based on a predicted result of the road grade and the vehicle speed in the scheduled travel route.

The battery output calculation unit 49 calculates or predicts a behavior of a charge-or-discharge power that is an output of the high-voltage battery 20 from the current position to the predetermined destination position in the scheduled travel route, based on a calculation result or a predicted result of the travel output in the scheduled travel route. In this case, for example, the battery output calculation unit 49 predicts a change pattern of the travel mode which is a travel pattern in the scheduled travel route, based on the behavior of the travel output in the travel scheduled route. In the engine travel mode, the battery output calculation unit 49 calculates the output of the high-voltage battery 20 based on outputs of the first MG 12 and the second MG 13 and consumption powers of auxiliary machines in the engine travel. In this case, for example, the outputs of the first MG 12 and the second MG 13 are generation powers, and the auxiliary machines include the electric compressor 29. In the assist travel mode, the battery output calculation unit 49 calculates the output of the high-voltage battery 20 based on the outputs of the first MG 12 and the second MG 13 and the consumption powers of the auxiliary machines in the assist travel. In this case, for example, the outputs of the first MG 12 and the second MG 13 are consumption powers. In the EV travel mode, the battery output calculation unit 49 calculates the output of the high-voltage battery 20 based on the outputs of the first MG 12 and the second MG 13 and the consumption powers of the auxiliary machines in the EV travel. In this case, for example, the outputs of the first MG 12 and the second MG 13 are consumption powers. In the power regeneration mode, the battery output calculation unit 49 calculates the output of the high-voltage battery 20 based on the outputs of the first MG 12 and the second MG 13 and the consumption powers of the auxiliary machines in the power regeneration. In this case, for example, the outputs of the first MG 12 and the second MG 13 are generation powers.

The SOC prediction unit 50 predicts a behavior of the SOC from the current position to the predetermined destination position in the scheduled travel route, based on a calculation result of the output of the high-voltage battery 20 in the scheduled travel route. The SOC prediction unit 50 determines whether the high-voltage battery 20 is in the saturation state where the high-voltage battery 20 cannot be charged with the regeneration power, by determining whether the predicted SOC reaches the upper limit that is a value in a fully charged state or in a state close to the fully charged state. When the SOC prediction unit 50 determines that the high-voltage battery 20 is in the saturation state, the SOC prediction unit 50 calculates a behavior of a predicted SOC exceeding quantity in the scheduled travel route, based on a behavior of the predicted SOC. In this case, for example, the SOC prediction unit 50 calculates a power regeneration quantity by which exceeding the upper limit, as the predicted SOC exceeding quantity. In this case, the power regeneration quantity is an integrated value of the regeneration power that is predicted to be charged when the high-voltage battery 20 is not in the saturation state. The predicted SOC exceeding quantity is equivalent to the required discharge increasing quantity that is the increasing quantity of the discharge quantity necessary to prevent the high-voltage battery 20 from becoming in the saturation state.

When the SOC prediction unit 50 determines that the high-voltage battery 20 is in the saturation state, the EV discharge increasing control unit 55 determines whether the EV discharge increasing control can be executed, for example, by determining whether a period where the travel output is in a predetermined range in the travel scheduled route. The predetermined range, for example, is set to a range where a negative influence to a driveability is small even though a driving force of the vehicle is limited.

When the EV discharge increasing control unit 55 determines that the EV discharge increasing control can be executed, the EV discharge increasing control unit 55 executes a driving force limitation to execute the EV discharge increasing control. In the driving force limitation, the EV discharge increasing control unit 55 limits the driving force of the vehicle in the period where the travel output is in the predetermined range to be less than or equal to an upper guard limit that is predetermined. The upper guard limit, for example, is set to an upper limit of an EV travel region (region of the driving force in the EV travel mode) or set to a value slightly smaller than the upper limit. Alternatively, the EV discharge increasing control unit 55 decreases the driving force of the vehicle by a decreasing correction quantity in the period where the travel output is in the predetermined range. Thus, a period where the driving force of the vehicle is in the EV travel region increases.

Then, the speed control unit 56 decreases a target speed that is a target value of the vehicle speed or an upper limit vehicle speed that is an upper limit of the vehicle speed, according to a driving force after being obtained by executing the driving force limitation in the period where the travel output is in the predetermined range. Since the HV control unit 52 controls the engine 11 and the MG 12, 13 by using the target vehicle speed or the upper limit vehicle speed, the vehicle speed is decreased, and an opportunity of the EV travel is increased. Then, the HV control unit 52 executes an EV discharge increasing control to increase the discharge quantity of the high-voltage battery 20.

The EV discharge increasing control unit 55 calculates a behavior of an increasing quantity of an EV discharge quantity caused by the EV discharge increasing control in the travel scheduled route. In this case, for example, the EV discharge increasing control unit 55 calculates an integrated value of a difference between (i) the discharge quantity of the high-voltage battery 20 caused by the EV travel that is the EV discharge quantity when the EV discharge increasing control is executed and (ii) the EV discharge quantity when the EV discharge increasing control is not executed, as the increasing quantity of the EV discharge quantity caused by the EV discharge increasing control.

The assist discharge quantity calculation unit 51 determines whether the required discharge increasing quantity can be ensured by the EV discharge increasing control, for example, by determining whether the increasing quantity of the EV discharge quantity caused by the EV discharge increasing control in the travel scheduled route is greater than or equal to the predicted SOC exceeding quantity.

When the assist discharge quantity calculation unit 51 determines that the required discharge increasing quantity can be ensured by the EV discharge increasing control, the assist discharge quantity calculation unit 51 does not execute the assist discharge increasing control. In this case, for example, the assist discharge quantity calculation unit 51 sets a charge quantity or the discharge quantity of the high-voltage battery 20 by a fuel-consumption maximization charge-or-discharge quantity setting, and calculates the discharge quantity of the high-voltage battery 20 caused by the assist travel that is an ordinary assist discharge quantity in the travel scheduled route.

When the assist discharge quantity calculation unit 51 determines that the required discharge increasing quantity cannot be ensured only by the EV discharge increasing control, the assist discharge quantity calculation unit 51 corrects the discharge quantity that is insufficient relative to the required discharge increasing quantity, by the increasing quantity of the discharge quantity caused by the assist discharge increasing control. In this case, for example, the assist discharge quantity calculation unit 51 calculates a difference between the predicted SOC exceeding quantity and the increasing quantity of the discharge quantity caused by the EV discharge increasing control, as the discharge quantity that is insufficient relative to the required discharge increasing quantity. The assist discharge quantity calculation unit 51 calculates the assist discharge quantity for the assist discharge increasing control in the travel scheduled route, to increase the increasing quantity of the assist discharge quantity obtained from the discharge quantity that is insufficient, relative to the ordinary assist discharge quantity in the travel scheduled route. In this case, a behavior of the output of the high-voltage battery 20 varies in cases where the assist discharge increasing control is not executed and the assist discharge increasing control is executed. The output of the engine 11 may be set such that the travel output is substantially identical. The assist discharge quantity may be set such that a power quantity that is greater than or equal to the predicted SOC exceeding quantity is consumed in the assist discharge increasing control and the EV discharge increasing control that is the discharge increasing control before a start of the power regeneration when it is predicted that the predicted SOC firstly reaches the upper limit. Alternatively, the assist discharge quantity may be set such that the power quantity that is greater than or equal to the predicted SOC exceeding quantity is consumed in the discharge increasing control before the start of the power regeneration when it is predicted that the predicted SOC firstly reaches the upper limit and in the discharge increasing control before the start of the power regeneration when it is predicted that the predicted SOC reaches the upper limit after or on the second time.

The HV control unit 52 executes the assist discharge increasing control to increase the discharge quantity of the high-voltage battery 20 in the assist travel, by controlling the engine 11 and the MG 12, 13 to achieve the assist discharge quantity for the assist discharge increasing control in the scheduled travel route.

After a start of the discharge increasing control, the HV control unit 52 determines whether the behavior of the predicted SOC shifts relative to the behavior of the actual SOC or determines whether a SOC shift factor that is predicted to lead the behavior of the predicted SOC to shift from the behavior of the actual SOC occurs. In this case, the SOC shift factor includes a vehicle control and an environment change. When the HV control unit 52 determines that the behavior of the predicted SOC shifts from the behavior of the actual SOC or determines that the SOC shift factor occurs, the HV control unit 52 executes a prediction of the SOC in the scheduled travel route again and corrects the discharge increasing control. Thus, when the behavior of the predicted SOC shifts from the behavior of the actual SOC, the controller can correct the predicted SOC by executing the prediction of the SOC again. The discharge increasing control is corrected based on the predicted SOC that is corrected. Thus, it can be prevented that the high-voltage battery 20 is in the saturation state by controlling the SOC to be less than the upper limit by the discharge increasing control that is corrected.

Hereafter, routines execute by the hybrid ECU 39 according to the first embodiment will be described referring to FIGS. 3 to 5.

As shown in FIG. 3, a main control routine is executed by the hybrid ECU 39 at a predetermined time period in a time interval where the hybrid ECU 39 is activated. When the present routine is activated, at 101, the hybrid ECU 39 determines whether a prediction of the scheduled travel route is difficult. In this case, when a destination position information of the vehicle cannot be obtained and a total number of junctions of routes is greater than or equal to a predetermined value, the hybrid ECU 39 determines that the prediction of the scheduled travel route is difficult. In this case, the predetermined value may be one or two.

Figure 6:
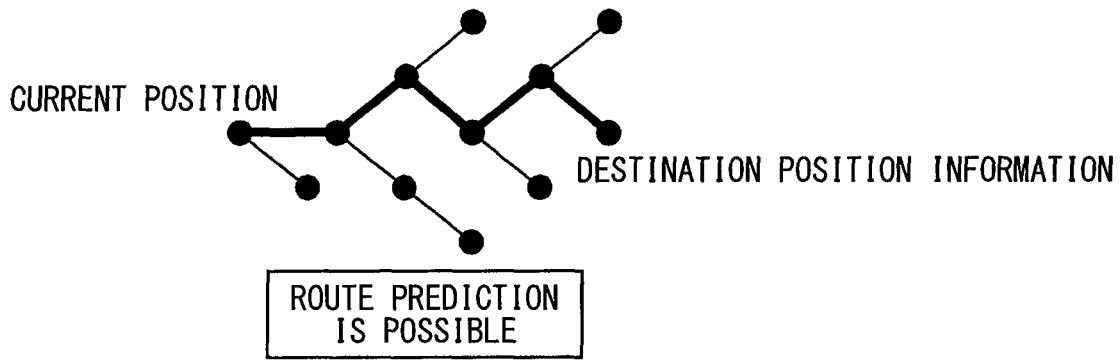
FIG. 6 includes (a), (b) and (c), (a) is a graph showing a condition where a route prediction is possible, (b) is a graph showing another condition where the route prediction is possible, (c) is a graph showing a condition where the route prediction is difficult.
Figure 6:
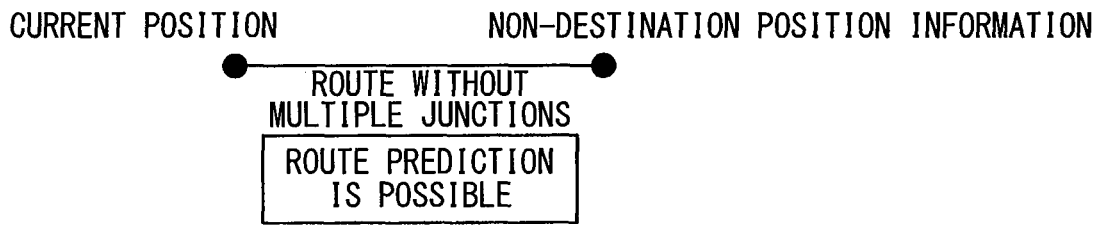
Figure 6:
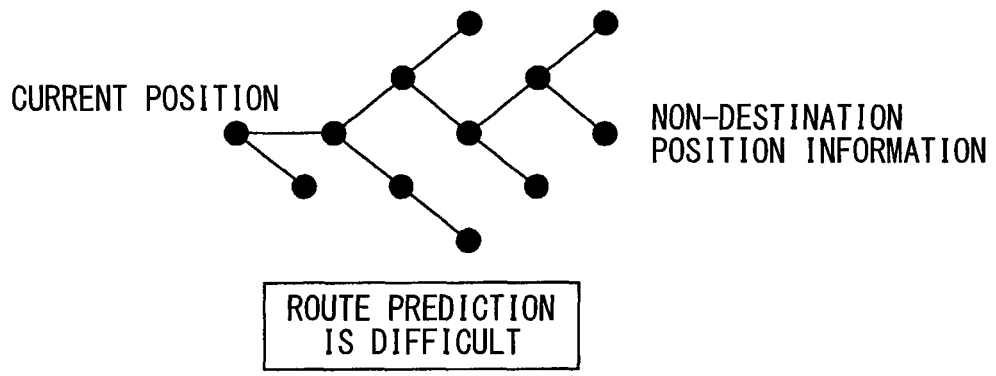
Figure 7:
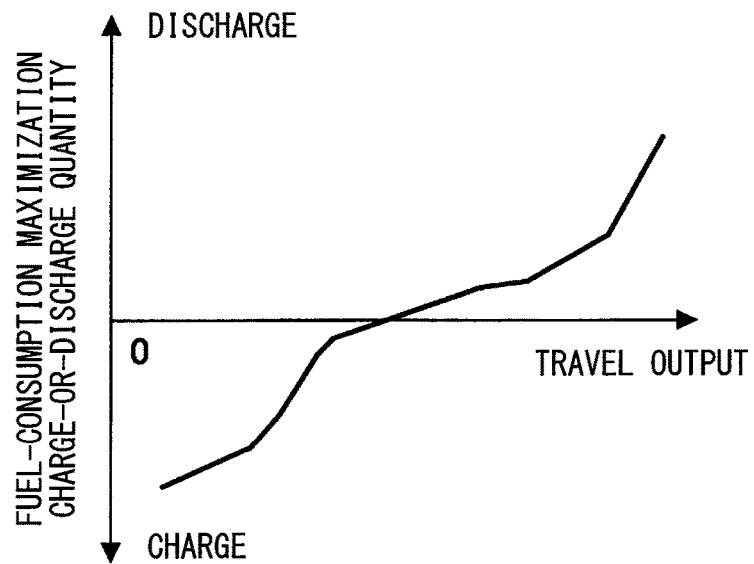
FIG. 7 is a graph showing a map of a fuel-consumption maximization charge-or-discharge quantity.

As shown in (a) of FIG. 6, when the destination position information exists while junctions of routes exist in a travelling direction, the scheduled travel route can be predicted. As shown in (b) of FIG. 6, when no junction exists or the total number of the junctions of routes in the travelling direction is small while the destination position information does not exist, the scheduled travel route can be predicted. As shown in (c) of FIG. 6, when the destination position information cannot be obtained while the total number of the junctions of routes in the travelling direction is greater than or equal to the predetermined value, it can be determined that the prediction of the scheduled travel route is difficult.

When the hybrid ECU 39 determined that the prediction of the scheduled travel route is difficult at 101, the hybrid ECU 39 proceeds to 112. At 112, the hybrid ECU 39 prohibits the discharge increasing control.

Then, the hybrid ECU 39 proceeds to 113 and executes the fuel-consumption maximization charge-or-discharge quantity setting. In the fuel-consumption maximization charge-or-discharge quantity setting, the hybrid ECU 39 sets a charge quantity or a discharge quantity of the high-voltage battery 20 that the fuel consumption becomes maximum according to the travel output of the vehicle, by using a map of a fuel-consumption maximization charge-or-discharge quantity shown in FIG. 7. In this case, for example, the charge quantity is a charge power, and the discharge quantity is a discharge power. The hybrid ECU 39 controls the engine 11, the first MG 12 and the second MG 13 to achieve the charge quantity or the discharge quantity.

When the hybrid ECU 39 determines that the prediction of the scheduled travel route is not difficult at 101, that is, the hybrid ECU 39 determines that the scheduled travel route can be predicted at 101, the hybrid ECU 39 proceeds to 102. At 102, the hybrid ECU 39 determines whether the high-voltage battery 20 is deteriorated, based on at least one of a temperature of the high-voltage battery 20, a voltage of the high-voltage battery 20 or an inner resistance of the high-voltage battery 20. In other words, the hybrid ECU 39 determines whether a deterioration state of the high-voltage battery 20 is greater than or equal to a predetermined state.

When the hybrid ECU 39 determines that the high-voltage battery 20 is deteriorated at 102, the hybrid ECU 39 proceeds to 112 and prohibits the discharge increasing control. Then, the hybrid ECU 39 proceeds to 113 and executes a fuel-consumption maximization charge-or-discharge quantity setting.

When the hybrid ECU 39 determines that the high-voltage battery 20 is not deteriorated at 102, the hybrid ECU 39 proceeds to 103. At 103, the hybrid ECU 39 measures the actual SOC of the high-voltage battery 20.

Then, the hybrid ECU 39 proceeds to 104 and determines whether the actual SOC is less than or equal to a predetermined value. In this case, the predetermined value is an allowable lower limit or a value slight greater than the allowable lower limit.

When the hybrid ECU 39 determines that the actual SOC is less than or equal to the predetermined value at 104, the hybrid ECU 39 proceeds to 114. At 114, the hybrid ECU 39 sets the charge quantity (charge power) of the high-voltage battery 20 to a total of consumption powers of the auxiliary machines including the electric compressor 29. Thus, the hybrid ECU 39 prohibits the discharge of the high-voltage battery 20, rotatably drives the first MG 12 or both the first MG 12 and the second MG 13 by the power of the engine 11, and generates power by the first MG 12 or both the first MG 12 and the second MG 13. In this case, a power generation quantity (generation power) of the first MG 12 or both the first MG 12 and the second MG 13 is the charge quantity of the high-voltage battery 20 and is a sum of the consumption powers of the auxiliary machines including the electric compressor 29.

Figure 8:
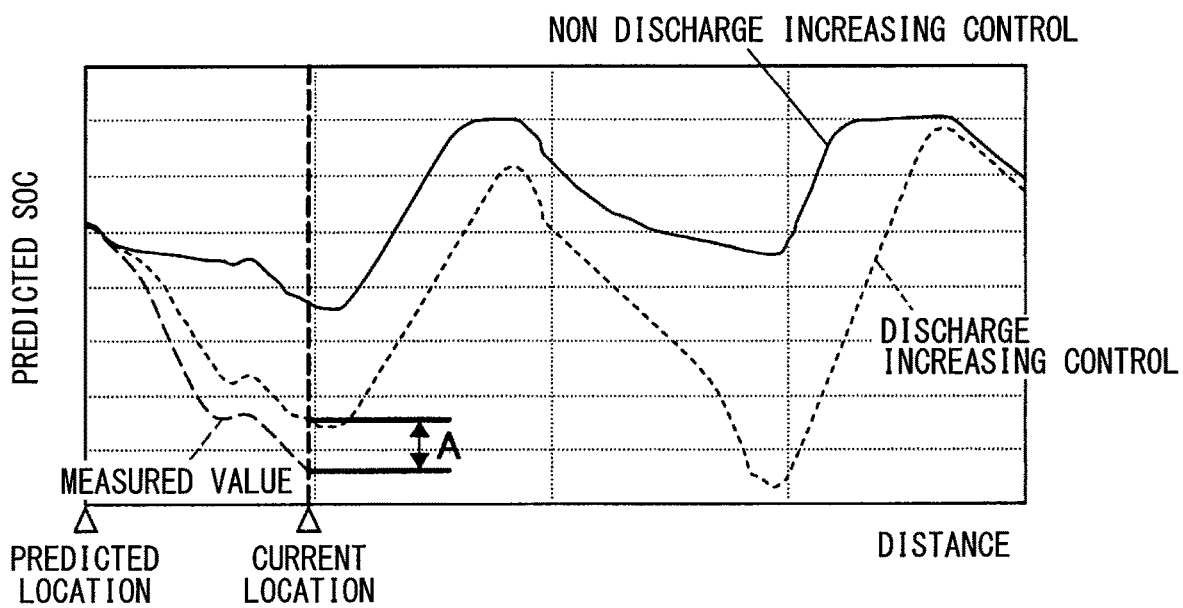
FIG. 8 is a graph showing a determination on whether the behavior of the predicted SOC shifts from a behavior of an actual SOC.

When the hybrid ECU 39 determines that the actual SOC is greater than the predetermined value at 104, the hybrid ECU 39 proceeds to 105. At 105, the hybrid ECU 39 determines whether the behavior of the predicted SOC shifts relative to the behavior of the actual SOC. In this case, as shown in FIG. 8, the hybrid ECU 39 calculates the SOC by subtracting a discharge-quantity increasing quantity in the discharge increasing control from a prediction time point of the predicted SOC to a present time point from the predicted SOC at the present time point when the discharge increasing control is not executed, as the predicted SOC at a current position when the discharge increasing control is executed. The hybrid ECU 39 determines whether the behavior of the predicted SOC shifts from the behavior of the actual SOC by determining whether a difference A between the predicted SOC at the current position when the discharge increasing control is executed and the actual SOC at the current position is greater than or equal to a predetermined value.

At 105, the hybrid ECU 39 sets an initial value of the predicted SOC to a value that the hybrid ECU 39 determines that the behavior of the predicted SOC shifts relative to the behavior of the actual SOC. Thus, when the hybrid ECU 39 proceeds to 105 for the first time after the start of the present routine, the hybrid ECU 39 determines a positive determination at 105 (105: Yes) and proceeds to 110. At 110, the hybrid ECU 39 executes a SOC prediction and discharge quantity calculation routine shown in FIG. 4. In this case, the hybrid ECU 39 predicts the SOC in the scheduled travel route. When the hybrid ECU 39 determines that the high-voltage battery 20 is in the saturation state based on the predicted SOC, the hybrid ECU 39 executes the discharge increasing control. When the assist discharge increasing control is executed, the hybrid ECU 39 calculates the assist discharge quantity (for example, discharge power) for the assist discharge increasing control.

When the hybrid ECU 39 determines that the behavior of the predicted SOC does not shift from the behavior of the actual SOC at 105, the hybrid ECU 39 proceeds to 106. At 106, the hybrid ECU 39 determines whether a change of a travel route (path) occurs. When the travel route changes, the road grade and the vehicle speed change, and the travel output and the travel pattern that is the change pattern of the travel mode change. Thus, the output of the high-voltage battery 20 changes, and the behavior of the SOC changes. The change of the travel route is included in the SOC shift factor. In this case, the SOC shift factor is the vehicle control that predicts the behavior of the predicted SOC shifts from the behavior of the actual SOC.

When the hybrid ECU 39 determines that the change of the travel route does not occur at 106, the hybrid ECU 39 proceeds to 107. At 107, the hybrid ECU 39 determines whether a change of an operation state of the auxiliary machines including the electric air-conditioner 24 and a light occurs. In this case, the change of the operation state of the auxiliary machines including the electric air-conditioner 24 and the light includes a switch on operation and a switch off operation. When the operation state of the auxiliary machines changes, the consumption power of the auxiliary machines changes. Thus, the output of the high-voltage battery 20 changes, and the behavior of the SOC changes. The change of the operation state of the auxiliary machines is included in the SOC shift factor. In this case, the SOC shift factor is the vehicle control that predicts the behavior of the predicted SOC shifts from the behavior of the actual SOC.

When the hybrid ECU 39 determines that the change of the operation state of the auxiliary machines does not occur at 107, the hybrid ECU 39 proceeds to 108. At 108, the hybrid ECU 39 determines whether a change of a wind speed or a change of a wind direction occurs. When the wind speed or the wind direction changes, the vehicle speed changes, and the travel output and the travel pattern change. Thus, the output of the high-voltage battery 20 changes, and the behavior of the SOC changes. The change of the wind speed and the change of the wind direction are included in the SOC shift factor. In this case, the SOC shift factor is the environment change that predicts the behavior of the predicted SOC shifts from the behavior of the actual SOC.

When the hybrid ECU 39 determines that the change of the wind speed and the change of the wind direction do not occur at 108, the hybrid ECU 39 proceeds to 109. At 109, the hybrid ECU 39 determines whether a change of a road surface state occurs. In this case, the road surface state includes a wetting of the road surface due to a rain, a snow cover of the road surface due to a snow and a freezing of the road surface due to a decrease of a temperature. When the road surface state changes, the vehicle speed changes, and the travel output and the travel pattern change. In this case, the output of the high-voltage battery 20 changes, and the behavior of the SOC changes. The change of the road surface state is included in the SOC shift factor. In this case, the SOC shift factor is the environment change that predicts the behavior of the predicted SOC shifts from the behavior of the actual SOC.

When the hybrid ECU 39 determines that the change of the road surface state does not occur at 109, the hybrid ECU 39 proceeds to 111. At 111, the hybrid ECU 39 holds the assist discharge quantity for the assist discharge increasing control that is calculated previously.

When the hybrid ECU 39 determines a positive determination at one of 105 to 109 (one of 105 to 109: Yes), the hybrid ECU 39 proceeds to 110. In this case, the hybrid ECU 39 determines that the behavior of the predicted SOC shifts from the behavior of the actual SOC or determines that the SOC shift factor occurs. At 110, the hybrid ECU 39 executes the SOC prediction and discharge quantity calculation routine shown in FIG. 4 again to execute the prediction of the SOC in the scheduled travel route again and the correct the discharge increasing control.

The SOC prediction and discharge quantity calculation routine shown in FIG. 4 is a sub routine of the main control routine shown in FIG. 3. The SOC prediction and discharge quantity calculation routine is executed at 110 and functions as a SOC prediction unit and a discharge control unit.

When the present routine is activated, at 201, the hybrid ECU 39 acquires the own vehicle position information from the navigation device 45. Then, the hybrid ECU 39 proceeds to 202 and predicts the scheduled travel route based on the destination position information and the junctions of routes in the travelling direction from the navigation device 45. According to the present embodiment, the navigation device 45 functions as an acquisition unit and a route prediction unit.

Then, the hybrid ECU 39 proceeds to 203 and predicts the behavior of the road grade from the current position to the predetermined destination position in the scheduled travel route, based on the own vehicle position information and the scheduled travel route. Then, the hybrid ECU 39 proceeds to 204 and predicts the behavior of the vehicle speed from the current position to the predetermined destination position in the scheduled travel route, based on the own vehicle position information, the scheduled travel route, the limit speed information, the traffic information, the weather information and the peripheral information. According to the present embodiment, an operation in 203 functions as a road grade prediction unit, and an operation in 204 functions as a vehicle speed prediction unit.

Then, the hybrid ECU 39 proceeds to 205 and calculates the behavior of the travel output from the current position to the predetermined destination position in the scheduled travel route, based on the predicted results of the road grade and the vehicle speed. The hybrid ECU 39 calculates the behavior of the charge-or-discharge power that is the output of the high-voltage battery 20 from the current position to the predetermined destination position in the scheduled travel route, based on the predicted result of the travel output. The hybrid ECU 39 predicts the behavior of the SOC from the current position to the predetermined destination position in the scheduled travel route, based on the predicted result of the output of the high-voltage battery 20. According to the present embodiment, an operation in 205 functions as the SOC prediction unit.

Then, the hybrid ECU 39 proceeds to 206 and determines whether the high-voltage battery 20 is in the saturation state that the high-voltage battery 20 cannot be charged with the regeneration power, by determining whether the predicted SOC reaches the upper limit.

When the hybrid ECU 39 determines that the high-voltage battery 20 is not in the saturation state at 206, that is, when the hybrid ECU 39 determines that the predicted SOC does not reach the upper limit at 206, the hybrid ECU 39 proceeds to 207. At 207, the hybrid ECU 39 executes the fuel-consumption maximization charge-or-discharge quantity setting (the same as operation in 113 shown in FIG. 3).

When the hybrid ECU 39 determines that the high-voltage battery 20 is in the saturation state at 206, that is, when the hybrid ECU 39 determines that the predicted SOC reaches the upper limit at 206, the hybrid ECU 39 proceeds to 208. At 208, the hybrid ECU 39 determines whether the EV discharge increasing control can be executed, for example, by determining whether the period where the travel output in the travel scheduled route is in the predetermined range exists.

When the hybrid ECU 39 determines that the EV discharge increasing control can be executed at 208, the hybrid ECU 39 proceeds to 209. At 209, the hybrid ECU 39 executes the driving force limitation for executing the EV discharge increasing control. In the driving force limitation, the hybrid ECU 39 limits the driving force of the vehicle in the period where the travel output is in the predetermined range to be less than or equal to the upper guard limit that is predetermined. Alternatively, the hybrid ECU 39 decreases the driving force of the vehicle by the decreasing correction quantity in the period where the travel output is in the predetermined range. Thus, the period where the driving force of the vehicle is in the EV travel region increases.

Then, the hybrid ECU 39 proceeds to 210, and decreases the target vehicle speed or the upper limit vehicle speed according to the driving force after the driving force limitation in the period where the travel output is in the predetermined range. Since the hybrid ECU 39 controls the engine 11 and the MG 12, 13 by using the target vehicle speed or the upper limit vehicle speed, the vehicle speed is decreased, and the opportunity of the EV travel is increased. Then, the hybrid ECU 39 executes the EV discharge increasing control to increase the discharge quantity of the high-voltage battery 20. Then, the hybrid ECU 39 proceeds to 211.

When the hybrid ECU 39 determines that the EV discharge increasing control cannot be executed at 208, the hybrid ECU 39 proceeds to 211 without executing operations in 209 and 210.

At 211, the hybrid ECU 39 executes an assist discharge quantity calculation routine shown in FIG. 5 and calculates the assist discharge quantity for the assist discharge increasing control as necessary. According to the present embodiment, operations in 206 to 211 function as the discharge control unit. In the assist discharge quantity calculation routine shown in FIG. 5, at 301, the hybrid ECU 39 calculates the predicted SOC exceeding quantity. In this case, as shown in (a) of FIG. 9, the hybrid ECU 39 calculates a behavior of the predicted SOC exceeding quantity from the current position to the predetermined destination position in the scheduled travel route, based on the behavior of the predicted SOC from the current position to the predetermined destination position in the scheduled travel route.

Then, the hybrid ECU 39 proceeds to 302, and calculates the increasing quantity of the EV discharge quantity caused by the EV discharge increasing control. In this case, for example, the hybrid ECU 39 calculates the behavior of the increasing quantity of the EV discharge quantity caused by the EV discharge increasing control from the current position to the predetermined destination position in the travel scheduled route, based on the difference between the EV discharge quantity when the EV discharge increasing control is executed and the EV discharge quantity when the EV discharge increasing control is not executed.

Then, the hybrid ECU 39 proceeds to 303, and determines whether the required discharge increasing quantity can be ensured by the EV discharge increasing control, for example, by determining whether the increasing quantity of the EV discharge quantity caused by the EV discharge increasing control in the travel scheduled route is greater than or equal to the predicted SOC exceeding quantity.

When the hybrid ECU 39 determines that the required discharge increasing quantity can be ensured by the EV discharge increasing control at 303, the hybrid ECU 39 proceeds to 304, prohibits the assist discharge increasing control, and does not execute the assist discharge increasing control. Then, the hybrid ECU 39 proceeds to 305, and executes the fuel-consumption maximization charge-or-discharge quantity setting (the same as operation in 113 shown in FIG. 3).

When the hybrid ECU 39 determines that the required discharge increasing quantity cannot be ensured only by the EV discharge increasing control at 303, the hybrid ECU 39 corrects an insufficient quantity relative to the required discharge increasing quantity by the increasing quantity of the discharge quantity caused by the assist discharge increasing control.

Figure 9:
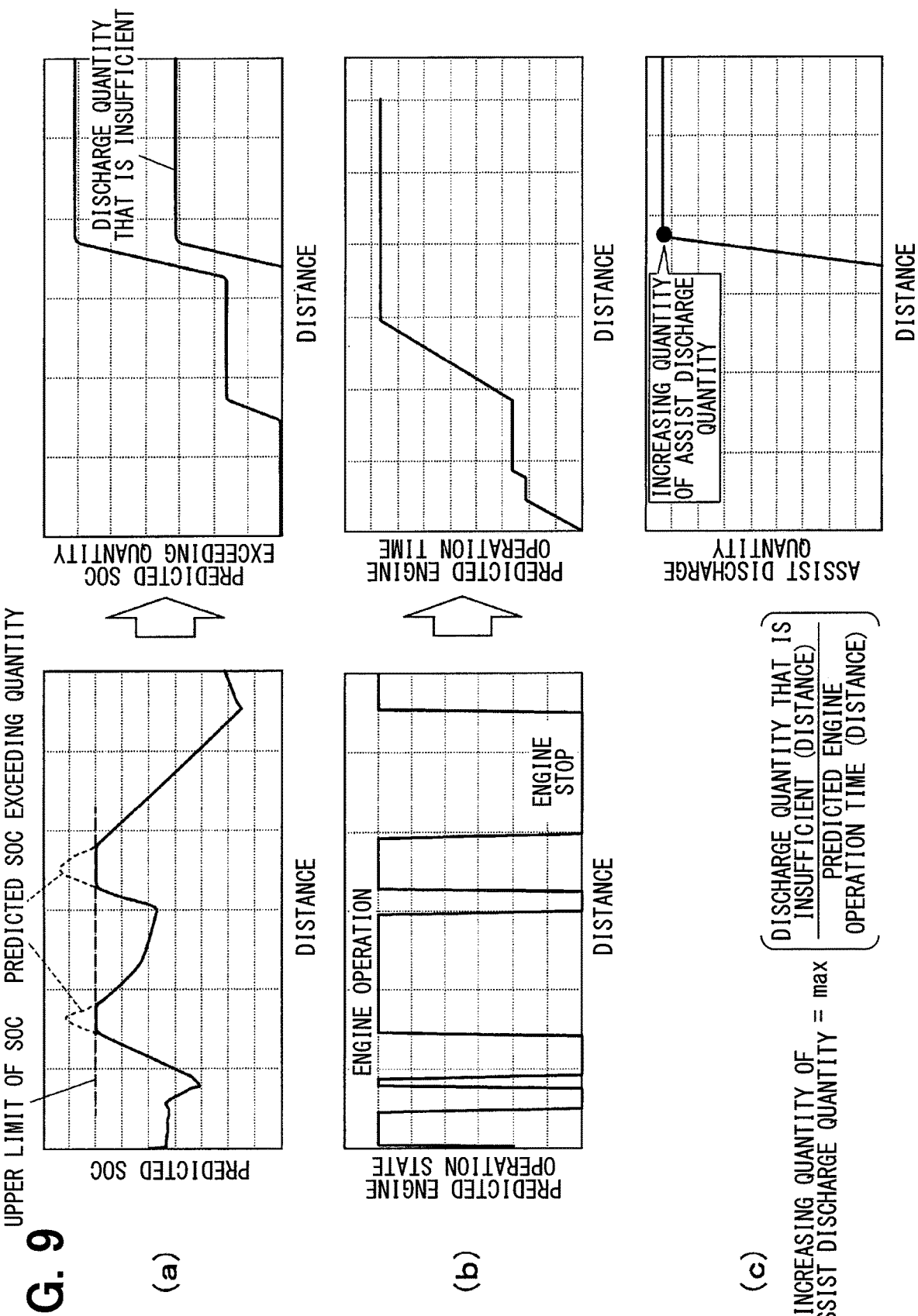
FIG. 9 includes (a), (b) and (c), (a) is a graph showing a calculation of a predicted SOC exceeding quantity, (b) is a graph showing a calculation of a predicted engine operation time, (c) is a graph showing a calculation of an assist discharge quantity.
Figure 10:
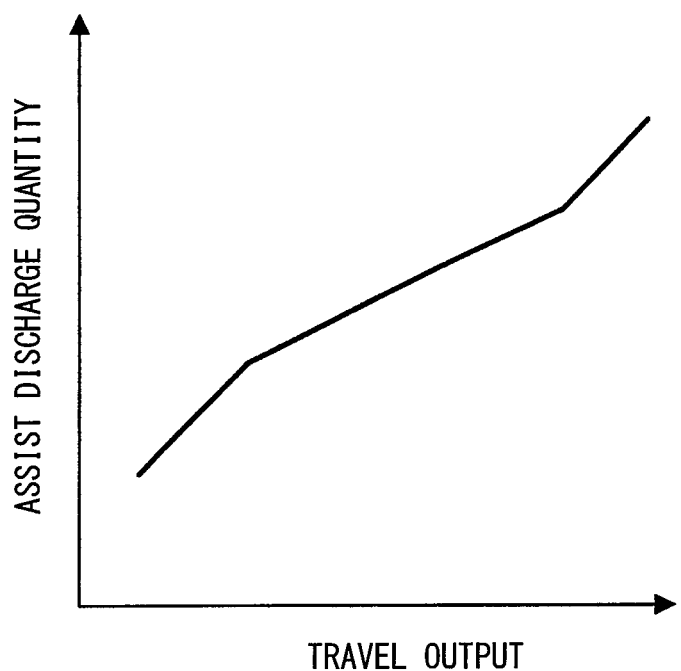
FIG. 10 is a graph showing a map of the assist discharge quantity according to a modification example of the first embodiment.

At 306, as shown in (a) of FIG. 9, the hybrid ECU 39 calculates the discharge quantity that is insufficient relative to the required discharge increasing quantity (that is a value equivalent to the predicted SOC exceeding quantity when the EV discharge increasing control). In this case, for example, the hybrid ECU 39 calculates the behavior of the discharge quantity that is insufficient relative to the required discharge increasing quantity from the current position to the predetermined destination position in the travel scheduled route, by calculating a difference between the predicted SOC exceeding quantity and the increasing quantity of the discharge quantity caused by the EV discharge increasing control from the current position to the predetermined destination position in the travel scheduled route.

Then, the hybrid ECU 39 proceeds to 307, and calculates a predicted engine operation time. In this case, as shown in (b) of FIG. 9, the hybrid ECU 39 calculates a behavior of the predicted engine operation time from the current position to the predetermined destination position in the scheduled travel route, based on a behavior of a predicted engine operation state from the current position to the predetermined destination position in the scheduled travel route.

Then, the hybrid ECU 39 proceeds to 308 and calculates the assist discharge quantity. In this case, as shown in (c) of FIG. 9, the hybrid ECU 39 calculates the increasing quantities of the assist discharge quantities by dividing the discharge quantity that is insufficient by the predicted engine operation time each distance in the scheduled travel route, and sets the maximum value of the assist discharge quantities as a final increasing quantity of the assist discharge quantity. The hybrid ECU 39 calculates the assist discharge quantity for the assist discharge increasing control in the travel scheduled route to increase the increasing quantity of the assist discharge quantity relative to the ordinary assist discharge quantity in the travel scheduled route. The hybrid ECU 39 executes the assist discharge increasing control to increase the discharge quantity of the high-voltage battery 20 in the assist travel, by controlling the engine 11 and the MG 12, 13 to achieve the assist discharge quantity.

According to the first embodiment, as the above description, the hybrid ECU 39 predicts the SOC in the scheduled travel route of the vehicle based on the predicted result of the road grade and the vehicle speed in the scheduled travel route. When the hybrid ECU 39 determines that the high-voltage battery 20 is in the saturation state based on the predicted SOC, the hybrid ECU 39 previously executes the discharge increasing control to increase the discharge quantity of the high-voltage battery 20 to prevent the high-voltage battery 20 from becoming in the saturation state based on the predicted SOC. Thus, the hybrid ECU 39 can prevent the high-voltage battery 20 from becoming in the saturation state, can effectively use the regeneration power, and can improve the fuel consumption.

Further, the discharge increasing control includes the assist discharge increasing control and the EV discharge increasing control. The discharge control unit includes a first mode to execute the assist discharge increasing control and a second mode to execute the EV discharge increasing control. When the EV discharge increasing control can be executed, the EV discharge increasing control is executed with priority relative to the assist discharge increasing control. Thus, the discharge quantity caused by the EV discharge increasing control can be increased, and the discharge quantity caused by the assist discharge increasing control can be decreased. Thus, an opportunity that the engine 11 operates in a region where the efficiency of the engine 11 is low in the assist travel can be suppressed, and the fuel consumption can be effectively improved.

According to the first embodiment, when the required discharge increasing quantity that is the increasing quantity of the discharge quantity necessary to prevent the high-voltage battery 20 from becoming in the saturation state can be ensured by the EV discharge increasing control, the assist discharge increasing control is not executed. When the required discharge increasing quantity cannot be ensured by the EV discharge increasing control, the insufficient quantity relative to the required discharge increasing quantity is corrected by the increasing quantity of the discharge quantity caused by the assist discharge increasing control. In this case, the insufficient quantity is the difference between the required discharge increasing quantity and the increasing quantity of the discharge quantity caused by the EV discharge increasing control. As a result, the EV discharge increasing control is executed with priority relative to the assist discharge increasing control. Thus, the required discharge increasing quantity can be ensured, the increasing quantity of the discharge quantity caused by the EV discharge increasing control can be increased as large as possible, and the increasing quantity of the discharge quantity caused by the assist discharge increasing control can be decreased as small as possible. Then, the fuel consumption can be effectively improved.

Further, according to the first embodiment, after the start of the discharge increasing control, the hybrid ECU 39 determines whether the behavior of the predicted SOC shifts relative to the behavior of the actual SOC or whether the SOC shift factor occurs. When the hybrid ECU 39 determines that the behavior of the predicted SOC shifts from the behavior of the actual SOC or determines that the SOC shift factor occurs, the hybrid ECU 39 executes a prediction of the SOC in the scheduled travel route again and corrects the discharge increasing control. Thus, when the behavior of the predicted SOC shifts from the behavior of the actual SOC, the controller can correct the predicted SOC by executing the prediction of the SOC again. The discharge increasing control is corrected based on the predicted SOC that is corrected. Thus, it can be prevented that the high-voltage battery 20 is in the saturation state by controlling the SOC to be less than the upper limit by the discharge increasing control that is corrected. Thus, the hybrid ECU 39 can surely prevent the high-voltage battery 20 from becoming in the saturation state, can effectively use the regeneration power, and can effectively improve the fuel consumption.

According to the first embodiment, when the actual SOC is less than or equal to a predetermined value, the hybrid ECU 39 prohibits the discharge of the high-voltage battery 20, rotatably drives the MG 12 (or the MG 12, 13) by the power of the engine 11, and generates power by the MG 12 (or the MG 12, 13). Then, an excessive decreasing of the SOC can be suppressed.

When the prediction of the scheduled travel route is difficult, the SOC cannot be correctly predicted. In this case, when the discharge increasing control is executed, it is possible that the fuel consumption is deteriorated due to an execution of the discharge increasing control based on an incorrect predicted SOC.

According to the first embodiment, when the prediction of the scheduled travel route is difficult, the hybrid ECU 39 prohibits the discharge increasing control. Thus, the hybrid ECU 39 can prevent the fuel consumption from being deteriorated due to the discharge increasing control based on the incorrect predicted SOC.

According to the first embodiment, when the high-voltage battery 20 is deteriorated, that is, when the deterioration state of the high-voltage battery 20 is greater than or equal to the predetermined state, the hybrid ECU 39 prohibits the discharge increasing control. When it is preferable that the charge-or-discharge of the high-voltage battery 20 is not executed while the high-voltage battery 20 is remarkably deteriorated, the hybrid ECU 39 prohibits the discharge increasing control. Thus, the hybrid ECU 39 can prevent the high-voltage battery 20 from being damaged.

According to the first embodiment, when the EV discharge increasing control is executed, the target vehicle speed or the upper limit vehicle speed is decreased according to the driving force after the driving force limitation to decrease the vehicle speed. However, it is not limited. For example, the target vehicle speed or the upper limit vehicle speed may be decreased by a predetermined value that is previously set to decrease the vehicle speed.

A method that executes the EV discharge increasing control with priority relative to the assist discharge increasing control is not limited to the above description in the first embodiment and may be modified. For example, the EV discharge increasing control and the assist discharge increasing control may be executed such that the increasing quantity of the discharge quantity caused by the EV discharge increasing control is greater than the increasing quantity of the discharge quantity caused by the assist discharge increasing control.

When the insufficient quantity relative to the required discharge increasing quantity is corrected by the increasing quantity of the discharge quantity caused by the assist discharge increasing control, the assist discharge quantity may be calculated as follows. The assist discharge quantity is calculated according to the travel output of the vehicle by referring to a map of the assist discharge quantity shown in FIG. 10. According to the map of the assist discharge quantity, the assist discharge quantity is set to increase in accordance with an increase in travel output of the vehicle and to decrease in accordance with a decrease in travel output of the vehicle. Thus, the discharge power of the high-voltage battery 20 is increased by the assist discharge which is the assist discharge power in accordance with an increase in travel output of the vehicle and decreases the assist discharge power in accordance with a decrease in travel output of the vehicle. Since the assist discharge power is decreased when the travel output of the vehicle is small, the engine 11 can operate at a region where the fuel consumption is good and the efficiency of the engine 11 is high without excessively decreasing the output of the engine 11. When the assist discharge power is increased in a case where the travel output of the vehicle is large, the output of the engine 11 is increased, and the engine 11 can operate at a region where the efficiency of the engine 11 is high.

Second Embodiment

Next, a second embodiment of the present disclosure will be described referring to FIG. 11. The substantially same parts and the components as the first embodiment are indicated with the same reference numeral and the same description will be omitted or simplified. Features of the second embodiment different from the first embodiment will be described.

Figure 11:
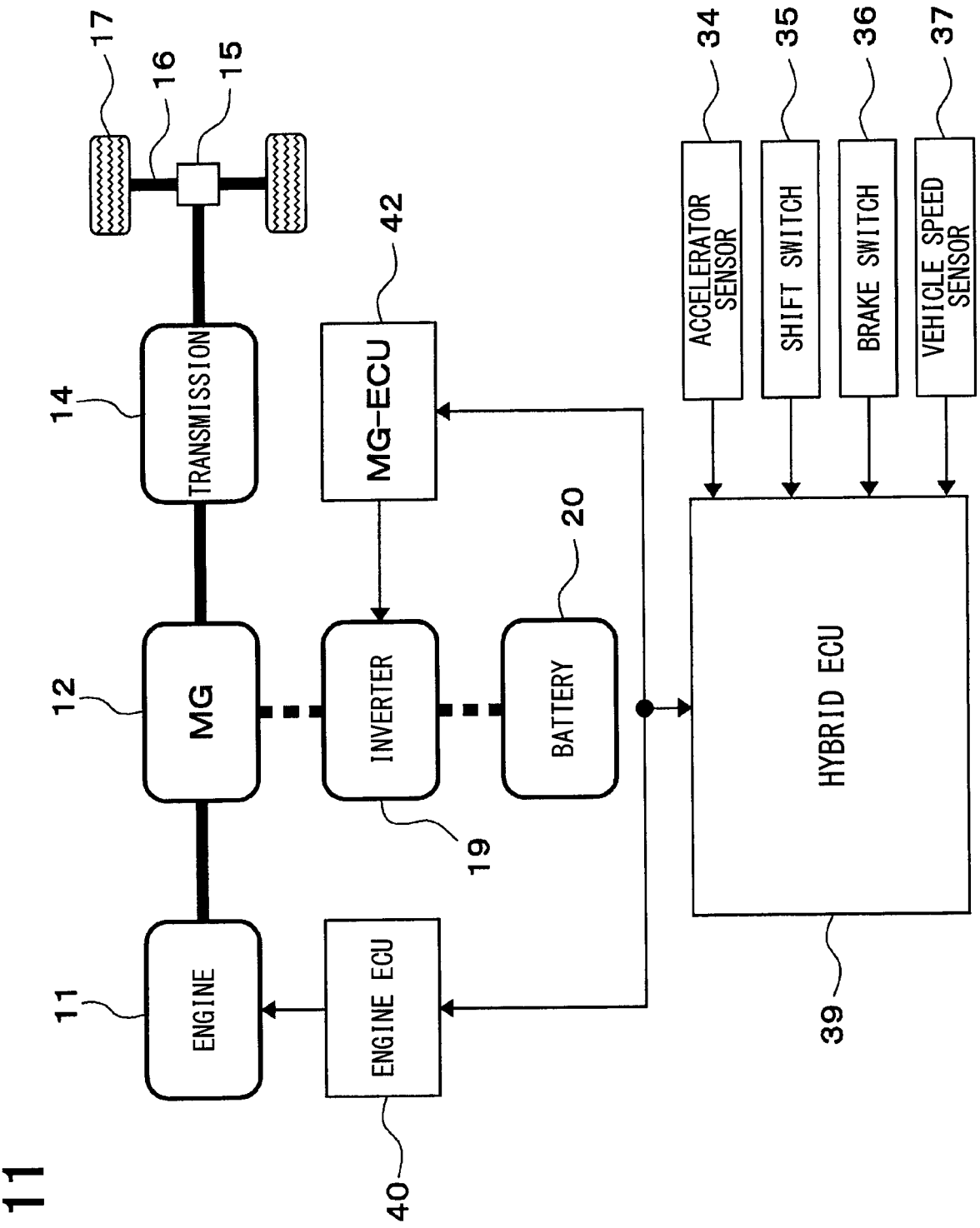
FIG. 11 is a schematic diagram showing an outline of the control system of the hybrid vehicle according to a second embodiment of the present disclosure.

According to the second embodiment, as shown in FIG. 11, the engine 11 and a MG 12 are mounted to the vehicle as the power sources of the vehicle. The power of the output shaft of the engine 11 is transmitted to the transmission 14 through the MG 12. The present disclosure may be applied to a hybrid vehicle having the above configuration.

According to the second embodiment, no clutch is in the power transmission channel from the engine 11 to the transmission 14. However, it is not limited. For example, a clutch may be located between the engine 11 and the MG 12, or a clutch may be located between the MG 12 and the transmission 14. Alternatively, a clutch may be embedded in the transmission 14. Further, the transmission 14 may be cancelled.

Third Embodiment

Next, a third embodiment of the present disclosure will be described referring to FIG. 12. The substantially same parts and the components as the first embodiment are indicated with the same reference numeral and the same description will be omitted or simplified. Features of the second embodiment different from the first embodiment will be described.

Figure 12:
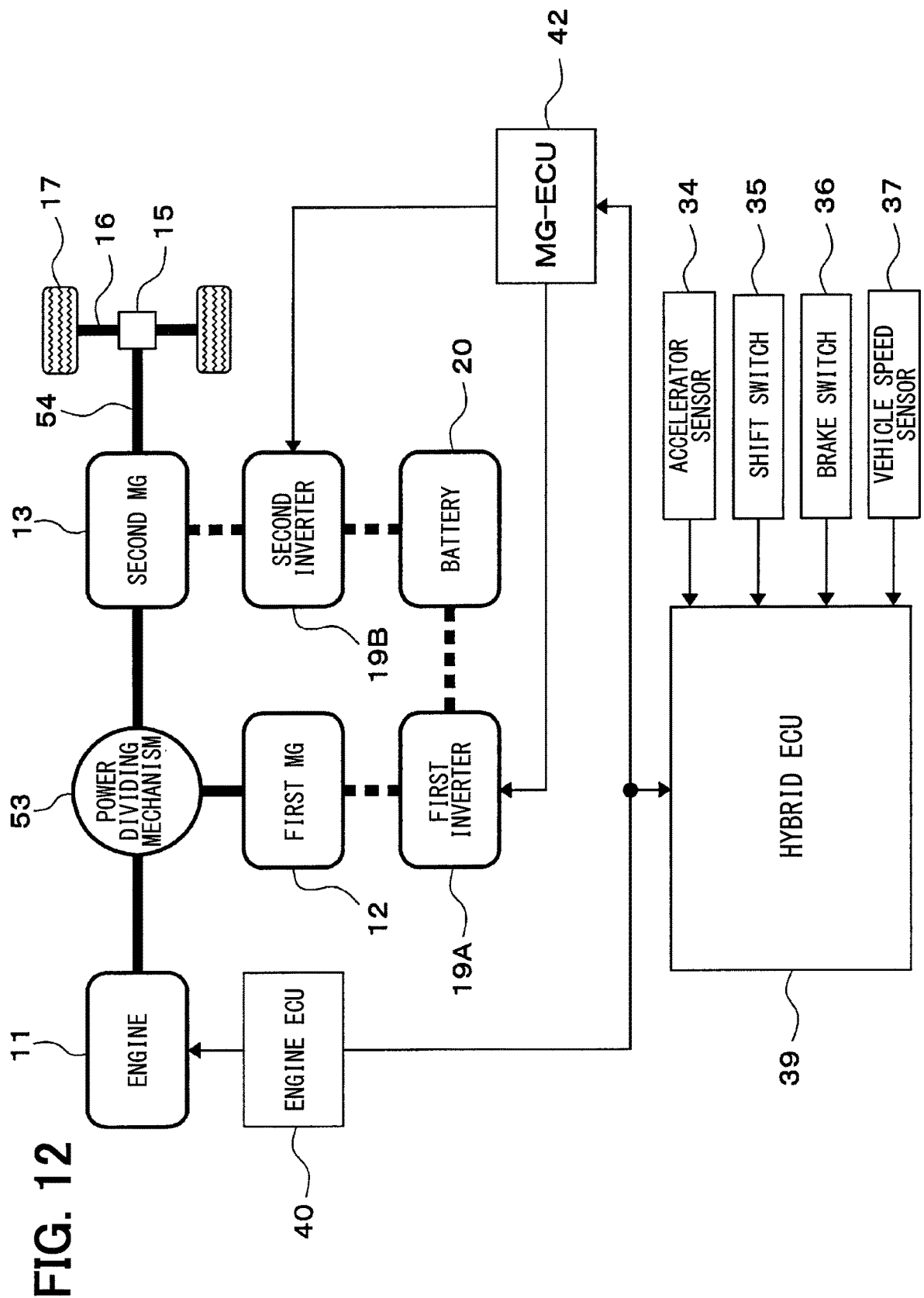
FIG. 12 is a schematic diagram showing an outline of the control system of the hybrid vehicle according to a third embodiment of the present disclosure.

According to the third embodiment, as shown in FIG. 12, the engine 11 and the MG 12, 13 are mounted to the vehicle as the power sources of the vehicle. The output shaft of the engine 11, a rotation shaft of the first MG 12 and a rotation shaft of the second MG 13 are connected with each other through a planetary gear mechanism 53 that is a power dividing mechanism. The rotation shaft of the second MG 13 is connected with a drive shaft 54. The first MG 12 and the second MG 13 transfer power with the high-voltage battery 20 through a first inverter 19A and a second inverter 19B, respectively. The present disclosure may be applied to a hybrid vehicle having the above configuration.

The present disclosure is not limited to the hybrid vehicles shown in FIGS. 1, 11 and 12. The present disclosure can be applied to a hybrid vehicle having other configurations where an engine and a MG are mounted to the vehicle as the power sources of the vehicle.

A determination whether the behavior of the predicted SOC shifts from the behavior of the actual SOC is not limited to the above description and can be modified. For example, it may be determined that the behavior of the predicted SOC shifts relative to the actual SOC, when a difference is greater than or equal to a predetermined value. In this case, the difference is a difference between (i) the predicted SOC at the present time point when the discharge increasing control is not executed and (ii) the SOC. The SOC is obtained by adding the discharge-quantity increasing quantity in the discharge increasing control from the prediction time point of the predicted SOC to the present time point to the actual SOC at the current position.

According to the above embodiments, the hybrid ECU 39 determines whether the SOC shift factor occurs. The SOC shift factor includes the change of the travel route, the change of the operation state of the auxiliary machine, the change of the wind speed, the change of the wind direction and the change of the road surface state. It is not limited. The SOC shift factor may include a vehicle control or an environment change. The vehicle control includes a vehicle stop that is not predicted or a sudden acceleration or a sudden deceleration. The environment change includes a change of a temperature or a change of a pressure. In other words, the hybrid ECU 39 may determine whether the vehicle stop, the sudden acceleration, the sudden deceleration, the change of the temperature or the change of the pressure occurs.

The hybrid ECU 39 may cancel at least one of a mode that generates power by rotatably driving the MG by the power of the engine while prohibiting the discharge of the high-voltage battery when the actual SOC is less than or equal to a predetermined value, a mode that prohibits the discharge increasing control when the prediction of the scheduled travel route is difficult, or a mode that prohibits the discharge increasing control when the deterioration state of the battery is greater than or equal to the predetermined state.

According to the above embodiments, the hybrid ECU 39 executes routines shown in FIGS. 3 to 5. However, it is not limited. An ECU other than the hybrid ECU 39 such as the engine ECU 40, the MG-ECU 42 or both the engine ECU 40 and the MG-ECU 42 may execute the routines. Alternatively, the hybrid ECU 39 and the ECU other than the hybrid ECU 39 may execute the routines.

At least a part of modes executed by the ECU may be configured by hardware including one or more integrated circuits (IC).

The present disclosure has been described with reference to the examples, but the present disclosure is not limited to the examples or the structures. The present disclosure includes various modification examples and modifications within the same range. In addition, while the various combinations and configurations, which are preferred, other combinations and configurations, including more, less or only a single element, are also within the spirit and scope of the present disclosure.

The invention claimed is:

1. A controller for a vehicle including an engine and a motor generator as power sources of the vehicle and a battery that transfers power with the motor generator, the controller that charges the battery with a regeneration power that is a power regenerated by the motor generator when the vehicle is decelerated, the controller comprising
   an electronic control unit (ECU) configured to:
      predict a SOC indicating a remaining capacity of the battery in a scheduled travel route of the vehicle, based on a predicted result of a road grade and a vehicle speed in the scheduled travel route;
      determine whether the battery becomes in a saturation state where the battery cannot be charged with the regeneration power; and
      execute a discharge increasing control to previously increase a discharge quantity of the battery to prevent the battery from becoming in the saturation state based on the SOC predicted by the ECU, when the ECU determines that the battery becomes in the saturation state, wherein
   the ECU includes:
      a first mode to execute an assist discharge increasing control as the discharge increasing control to increase the discharge quantity of the battery in an assist travel where the vehicle travels by both power of the engine and power of the motor generator; and
      a second mode to execute an EV discharge increasing control as the discharge increasing control to increase the discharge quantity of the battery by decreasing the vehicle speed according to a driving force of the vehicle after limiting the driving force and by increasing an opportunity of an EV travel where the vehicle travels only by power of the motor generator, and
   when the EV discharge increasing control can be executed, the ECU is configured to execute the EV discharge increasing control with priority relative to the assist discharge increasing control.

2. The controller for the vehicle according to claim 1, wherein
   the ECU is configured not to execute the assist discharge increasing control, when a required discharge increasing quantity that is an increasing quantity of a discharge quantity necessary to prevent the battery from becoming in the saturation state can be ensured by the EV discharge increasing control.

3. The controller for the vehicle according to claim 2, wherein
   the ECU is further configured to correct an insufficient quantity relative to the required discharge increasing quantity by the assist discharge increasing control, when the required discharge increasing control cannot be ensured by the EV discharge increasing control.

4. The controller for the vehicle according to claim 1, wherein
   the ECU is further configured to predict a behavior of the road grade from a current position to a predetermined destination position in the scheduled travel route, based on an own vehicle position information and the scheduled travel route.

5. The controller for the vehicle according to claim 1, wherein
   the ECU is further configured to predict a behavior of the vehicle speed from a current position to a predetermined destination position in the scheduled travel route, based on an own vehicle position information, the scheduled travel route, a limit speed information, a traffic information, a weather information and a peripheral information.

* * * * *